United States Patent [19]

Bland et al.

[11] 4,018,104

[45] Apr. 19, 1977

[54] FRICTIONALLY HELD CONTROL LINKAGE FOR ENGINE THROTTLE CONTROLS AND THE LIKE

[75] Inventors: James R. Bland; Rueben R. Brunka, both of Aurora, Ill.

[73] Assignee: Caterpillar Tractor Co., Peoria, Ill.

[22] Filed: Mar. 17, 1975

[21] Appl. No.: 558,980

[52] U.S. Cl. .................................. 74/531; 74/513; 403/116; 403/146; 123/98

[51] Int. Cl.² .......................................... G05G 5/06

[58] Field of Search ............ 74/531, 513, 512, 504, 74/532; 123/98; 403/116, 146

[56] References Cited

UNITED STATES PATENTS

| | | | |
|---|---|---|---|
| 1,143,347 | 6/1915 | Baird | 123/98 |
| 2,373,225 | 4/1945 | Clickner | 74/531 |
| 2,382,330 | 8/1945 | Pain | 74/531 |
| 2,385,881 | 10/1945 | Peterson | 74/531 X |
| 2,401,741 | 6/1946 | Korodi et al. | 74/531 |
| 3,525,415 | 8/1970 | Bata et al. | 74/513 X |

Primary Examiner—Samuel Scott
Assistant Examiner—F. D. Shoemaker
Attorney, Agent, or Firm—Phillips, Moore, Weissenberger, Lempio & Majestic

[57] ABSTRACT

A throttle control linkage adapted for connection to the governor mechanism of an engine preferably comprises a slotted quadrant slidably mounted on a pin attached to a support member. The quadrant is held in a selected position on the support member by a frictional device comprising at least one elastomeric member compressed against a side of the quadrant by spring means, preferably in the form of a pair of back-to-back Belleville washers.

14 Claims, 2 Drawing Figures

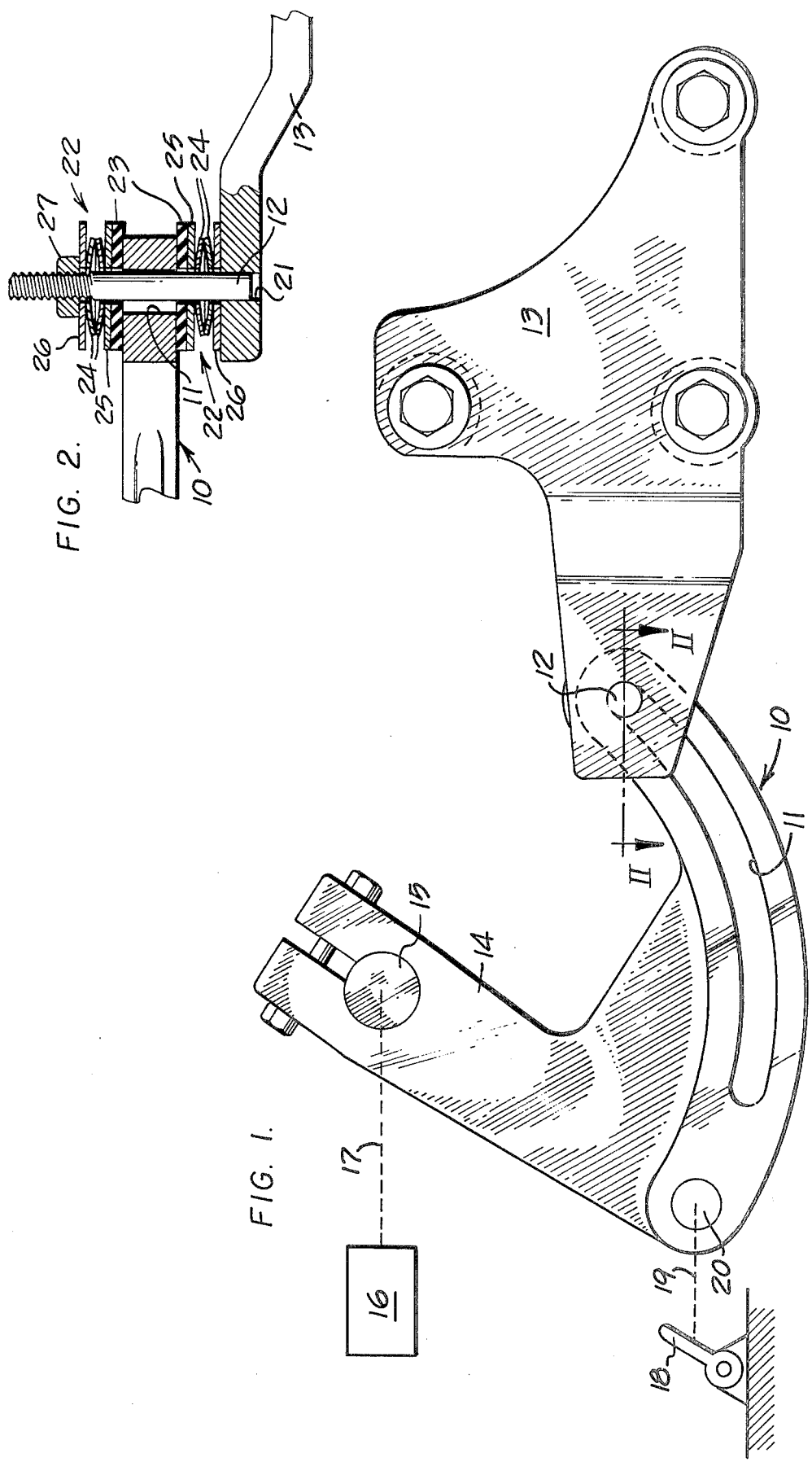

FRICTIONALLY HELD CONTROL LINKAGE FOR ENGINE THROTTLE CONTROLS AND THE LIKE

BACKGROUND OF THE INVENTION

Conventional governor mechanisms for diesel engines are normally connected to a linkage adapted to be actuated by an operator's control handle. When the handle is moved to a selected position of engine operation, means are normally provided for retaining the handle in such position to free the operator's hand for actuation of other control levers or the like. Such means often times comprises a frictional device directly associated with the handle to retain it in such selected position. Many such devices are complex and prone to undue wear after continued use which affects their holding capabilities.

SUMMARY OF THIS INVENTION

An object of this invention is to provide an improved means for frictionally holding a governor mechanism in a selected position on a support member. Such means, particularly adapted for holding a governor mechanism in position during operation of a diesel engine, preferably comprises at least one elastomeric member frictionally engaging a side of the control member and compressed there against by spring means. The control member preferably comprises a slotted quadrant slidably mounted on the support member and the spring means preferably comprises at least one pair of back-to-back Belleville washers.

BRIEF DESCRIPTION OF THE DRAWINGS

Other objects of this invention will become apparent from the following description and accompanying drawing wherein:

FIG. 1 is a side elevational view of a portion of a control linkage having the frictional holding means of this invention operatively associated therewith; and FIG. 2 is a sectional view of the holding means, taken in the direction of arrows II—II in FIG. 1.

DETAILED DESCRIPTION

Referring to the drawing, a control member or quadrant 10 having an arcuate slot 11 formed therethrough is slidably mounted on a pin 12. The pin is welded or otherwise suitably secured to a support bracket 13, detachably mounted on an engine (not shown). Quadrant 10 has an arm 14 thereof secured on a shaft 15 of a governor mechanism 16, including a linkage 17. The rotational center of the shaft defines the center for the radius defining slot 11.

The arm is mechanically connected to an operator's control handle 18 by a linkage 19 and a pin 20, such as the type disclosed in U.S. Pat. No. 3,145,624, assigned to the assignee of this application. Governor mechanism 16 may be of the type disclosed in U.S. Pat. No. 2,961,229, also assigned to the assignee of this application.

Referring to FIG. 2, a first end of pin 12 is suitably secured to a bore 21 formed through bracket 13. Quadrant 10 is frictionally held at a selected position, relative to pin 12, by holding means 22 of this invention comprising a pair of elastomeric (e.g., reinforced rubber) members or washers 23 disposed on either side of the quadrant. The washers are each compressed by a pair of back-to-back Belleville washers 24 disposed axially between a pair of inboard and outboard flat metallic washers 25 and 26, respectively.

Adjustment means in the form of a nut 27, threadably mounted on a second end of pin 12, preloads washers 24 to compress washers 23 under a predetermined pressure against respective sides of the quadrant.

It should be noted that holding means 22 is disposed substantially downstream of handle 18 in the illustrated actuating linkage for the governor mechanism. Such disposition substantially reduces the composite "play" in the linkage, normally occurring in systems wherein a holding device is directly associated with the counterpart to handle 18. Thus, fuel metering errors are substantially reduced in governor mechanism 16.

We claim:

1. A control linkage operatively connected to a control mechanism of an engine comprising
   a control member movably mounted on a support member and operatively connected to said control mechanism,
   a pin secured to said support member,
   an operator's control handle operatively connected to said control member for selectively moving the same on said support member, and
   means, including an annular elastomeric washer mounted on said pin and frictionally engaging a side of said control member, for frictionally holding said control member relative to said support member upon movement of said control handle.

2. The control linkage of claim 1 wherein said control member comprises a quadrant pivotally mounted on a rock shaft and having an arcuate slot formed therethrough slidably mounted on the pin secured to said support member, said slot defined by a radius having its center at the rotational axis of said rock shaft.

3. The control linkage of claim 1 wherein said elastomeric washer is compressed between said control and support member.

4. The control linkage of claim 3 further comprising spring means for compressing said elastomeric washer against said control member.

5. The control linkage of claim 4 wherein a said elastomeric washer and spring means are mounted on each side of said control member.

6. The control linkage of claim 1 wherein said means further comprises a pair of back-to-back Belleville washers mounted on said pin to compress said elastomeric washer against said control member.

7. The control linkage of claim 6 further comprising adjustment means mounted for axial movement on said pin for preloading said Belleville washers to compress said elastomeric washer under a predetermined pressure against said control member.

8. The control linkage of claim 7 further comprising a pair of flat washers mounted on said pin on either side of said Belleville washers and abutting said elastomeric washer and said adjustment means, respectively.

9. The control linkage of claim 8 wherein a said elastomeric washer, pair of Belleville washers and pair of flat washers are mounted on said pin and on either side of said control member.

10. In a control linkage of the type comprising a first member movably mounted on a pin secured to a stationary second member, said first member comprising a quadrant having an arcuate slot formed therein and slidably mounted on said pin and an annular elastomeric washer mounted on said pin to frictionally engage a side of said first member.

11. The control linkage of claim 10 further comprising a pair of back-to-back Belleville washers mounted on said pin to compress said elastomeric washer against said control member.

12. The control linkage of claim 11 further comprising adjustment means threadably mounted for axial movement on said pin for preloading said Belleville washers to compress said elastomeric washer under a predetermined pressure against said control member.

13. The control linkage of claim 12 further comprising a pair of flat washers mounted on said pin on either side of said Belleville washers and abutting said elastomeric washer and said adjustment means, respectively.

14. The control linkage of claim 13 wherein a said elastomeric washer, pair of Belleville washers and pair of flat washers are mounted on said pin and on either side of said control member.

* * * * *